UNITED STATES PATENT OFFICE.

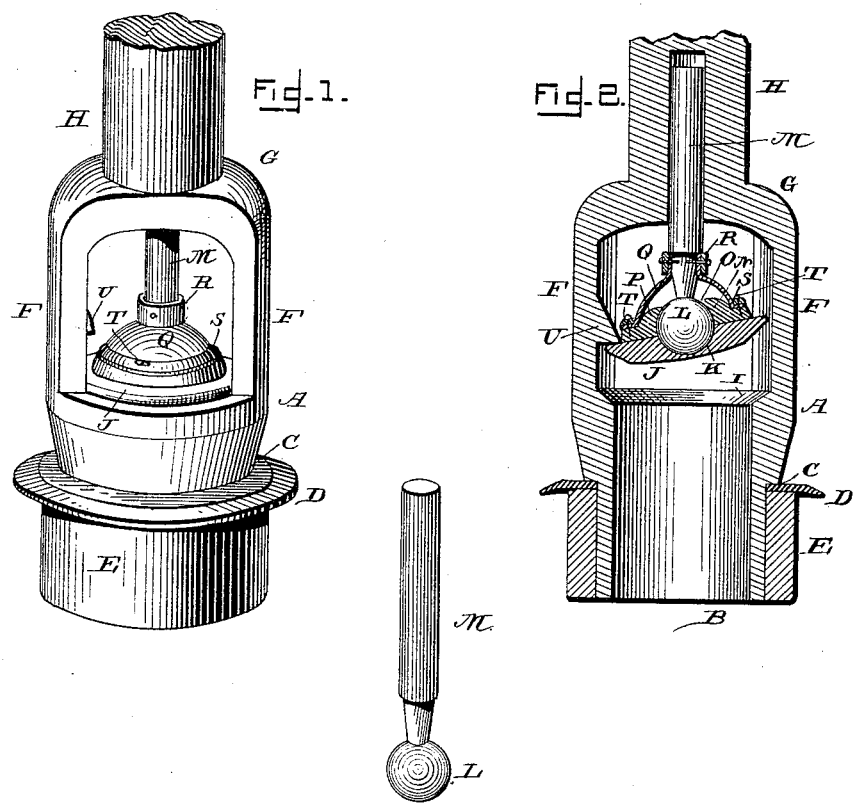

JOSEPH FOX, OF WEST MIDDLEBURG, OHIO.

LIFTING-VALVE FOR TUBULAR WELLS.

SPECIFICATION forming part of Letters Patent No. 348,491, dated August 31, 1886.

Application filed February 20, 1886. Serial No. 192,723. (No model.)

*To all whom it may concern:*

Be it known that I, JOSEPH FOX, a citizen of the United States, and a resident of West Middleburg, in the county of Logan and State of Ohio, have invented certain new and useful Improvements in Lifting-Valves for Tubular Wells; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved valve applied in a piston. Fig. 2 is a vertical sectional view of the same; and Fig. 3 is a perspective detail view of the valve and its stem and the connections between them, showing them separated.

Similar letters of reference indicate corresponding parts in all the figures.

My invention has relation to valves for tubular wells, and especially for the valves for pistons in tubular wells, although the valve may be applied to other purposes; and it consists in the improved construction and combination of parts of such a valve, as hereinafter more fully described and claimed.

In the accompanying drawings, the letter A indicates the body of the piston. The lower end, B, is reduced, so as to form a shoulder, C, against which a flat packing-ring, D, of leather or similar flexible material, is secured by a sleeve, E, which fits upon the reduced end of the piston, and which bears with its upper end against the ring, clamping it toward the shoulder. The upper portion of the piston is formed with a cage consisting of two upright side pieces, F F, connected at their upper ends by a yoke, G, which is formed with a perforation and a corresponding upwardly-projecting thimble, H, to which the piston-rod may be attached. The upper end of the piston-body, to which the upright side pieces are secured, is formed with a slightly-beveled valve-seat, I, upon which a valve, J, having a slightly rounded or beveled under side, plays. The upper flat side of this valve is formed with a hemispherical socket, K, into which the lower half of a spherical enlargement or knob, L, upon the lower end of the valve-stem M, fits, and the upper end of this valve-stem slides in the perforation and thimble of the cage. A plate, N, having a perforation, O, and a hemispherical bulge, P, at its middle, fits upon the top of the valve and forms the other half of the spherical socket for the ball of the valve-stem, the valve-stem projecting through the aperture in the plate, and the central perforated portion of an elastic diaphragm, Q, is secured by a means of a collar, R, to the valve-stem, and has its outer edge secured by means of a ring, S, to the edge of the bulged plate, the said ring, the elastic diaphragm, and the plate being all secured together and to the flat top of the valve by means of screws T T. The inner side of one of the uprights is provided with a downwardly-facing shoulder or stop, U, which will bear against one edge of the valve when it has been raised to that height, serving to tilt the valve. It will now be seen that as the valve is raised by the water passing through the valve-seat under it, it will always come to a fit upon its seat on dropping back, as the ball-and-socket joint, by means of which the stem and valve are connected, will allow the valve to adapt itself to any slight unevenness of the seat, and the valve may be raised farther up at one side after the stem has touched the top of the thimble, on account of the edge of the valve striking the shoulder, which will tilt the valve so that one side will be raised, allowing a greater quantity of water to pass through the valve-seat than if the valve were rigid upon the stem. The elastic diaphragm serves to cover the aperture in the plate or cap for the socket, preventing any water from entering the socket, and thus corroding the ball or socket, which are of metal, and preferably of brass or iron.

The valve may be employed at other points in a well-tube, or in any pump or similar plate where a valve is placed, and the valve will always be fitted upon the seat without regard to any small inequalities of the seat, and it will likewise allow more water to pass through it in proportion to its size than a valve with the body of the valve firmly and rigidly attached to the stem.

Having thus described my invention, I claim and desire to secure by Letters Patent of the United States—

1. The combination of a slightly-beveled valve-seat having a guide-thimble above it, a valve having its under side slightly beveled or rounded, and having a hemispherical socket in its upper flat side, a plate or cap having a central aperture and a central hemispherical bulge, a valve-stem sliding in the guide and fitting in the socket formed in the valve and by the cap, an elastic diaphragm secured with its perforated center to the valve-stem, and a ring securing the edge of the diaphragm and the edge of the cap to the upper side of the valve by screws, as and for the purpose shown and set forth.

2. The combination of a valve-seat having beveled or rounded edges around its aperture, a cage above the seat having a plain upright and an upright provided with a downwardly-facing shoulder upon its inner side, and having a yoke at the top provided with a guide-thimble, a valve having a beveled or rounded under side, and having a hemispherical socket in its upper flat side, a cap or plate having a central hemispherical bulge provided with an aperture, a valve-stem sliding in the guide-thimble and having a ball at its lower end fitting in the socket, an elastic diaphragm secured with its perforated center to the stem and having its edges fitting at the edges of the cap, and a ring securing the edges of the diaphragm and of the cap to the top of the valve by screws passing through them and it, as and for the purpose shown and set forth.

In testimony that I claim the foregoing as my own I have hereunto affixed my signature in presence of two witnesses.

JOSEPH FOX.

Witnesses:
 OLIVER MARQUIS,
 JOSEPH H. POOL.